United States Patent
Wong

(10) Patent No.: US 7,653,630 B2
(45) Date of Patent: Jan. 26, 2010

(54) METHOD AND APPARATUS FOR FACILITATING PRIVILEGED OBJECT STORES IN A DATABASE

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 286 days.

(21) Appl. No.: 11/210,326

(22) Filed: Aug. 24, 2005

(65) Prior Publication Data

US 2007/0055667 A1 Mar. 8, 2007

(51) Int. Cl.
*G06F 17/30* (2006.01)

(52) U.S. Cl. .............. 707/9; 707/100; 726/2

(58) Field of Classification Search ............ None
See application file for complete search history.

(56) References Cited

U.S. PATENT DOCUMENTS

| | | | |
|---|---|---|---|
| 6,457,007 B1 * | 9/2002 | Kikuchi et al. | 707/10 |
| 6,871,346 B1 * | 3/2005 | Kumbalimutt et al. | 707/100 |
| 7,346,844 B1 * | 3/2008 | Baer et al. | 434/362 |
| 2002/0143773 A1 * | 10/2002 | Spicer et al. | 707/10 |
| 2004/0123234 A1 * | 6/2004 | Anderson et al. | 715/513 |
| 2005/0015591 A1 * | 1/2005 | Thrash et al. | 713/166 |
| 2005/0234849 A1 * | 10/2005 | McCauley et al. | 707/1 |
| 2006/0282433 A1 * | 12/2006 | Dutta et al. | 707/9 |

OTHER PUBLICATIONS

Sybase Adaptive Server Enterprise System Administration Guide, Oct. 1999, Sybase, Inc., Adaptive Server Enterprise Version 12, Section 5-9, 7-7.*

* cited by examiner

*Primary Examiner*—Tim T. Vo
*Assistant Examiner*—Jau-Shya Meng
(74) *Attorney, Agent, or Firm*—Park, Vaughan & Fleming, LLP

(57) ABSTRACT

A system that facilitates implementing a privileged schema in a database, wherein the privileged schema is comprised of a set of database objects. Note that in relational database terminology, sometimes object stores are simply referred to as schema. The system starts by creating the privileged schema. Next, the system receives a database operation from a user. The system then authenticates the user to determine if the user is the owner of the privileged schema. If so, the system executes the database operation. On the other hand, if the user is not the owner, then the system rejects the database operation.

20 Claims, 4 Drawing Sheets

METHOD AND APPARATUS FOR FACILITATING PRIVILEGED OBJECT STORES IN A DATABASE

BACKGROUND

1. Field of the Invention

The present invention relates to database security. More specifically, the present invention relates to a method and an apparatus for facilitating privileged object stores in a database.

2. Related Art

In database environments, users are typically associated with a set of privileges. Privileges associate permissions to perform various actions with a user or group of users. Exemplary action which may be subject to such permissions can include: executing a stored procedure, viewing a table, or performing any other action normally associated with databases.

In order to satisfy the security policy of their organization, users are typically restricted to performing specific operations. However, this is not necessarily sufficient to guarantee the security of a database. This is because in addition to low-level users who are subject to privileges, organizations typically have database administrators, security officers, and privileged users who are typically not confined by database permissions.

Currently, if a user needs to protect sensitive information stored in a database from a database administrator or a security officer, the user must depend on organizational policy and contractual obligations. Not only is it difficult to enforce security with these limited tools, but it is difficult to prove to auditors that such methods have effectively secured confidential data. For example, even if a security officer does not know a user's password and does not have access to a user's database objects, the security officer has the power to reset the user's password and to thereby gain access to the user's database objects. Furthermore, in many instances, the security officer has the ability to modify system audit logs to hide such activity.

In many systems, privileges can be inherited in the sense that a super-user has privileges over users who are lower in the hierarchy. However, sometimes a user who is lower in the hierarchy might be assigned work from a third-party which involves accessing database objects that the super-user should not be privy to. In such a situation, an organization is once again held hostage to the effectiveness of organizational policy and contractual obligations.

Hence, what is needed is a method to facilitate enhanced database security without the problems listed above.

SUMMARY

One embodiment of the present invention provides a system that facilitates implementing a privileged schema in a database, wherein the privileged schema is comprised of a set of database objects. Note that in relational database terminology, sometimes object stores are simply referred to as schema. The system starts by creating the privileged schema. Next, the system receives a database operation from a user. The system then authenticates the user to determine if the user is the owner of the privileged schema. If so, the system executes the database operation. On the other hand, if the user is not the owner, then the system rejects the database operation.

In a variation of this embodiment, prior to creating the privileged schema, the system enables the privileged schema feature during installment of the database at the request of the user. Additionally, the system receives the selection of an authentication service for the privileged schema from the user.

In a further variation, the process of authenticating the user is provided by a third party service, which can involve, for example, using Kerberos, RADIUS, and any other authentication-determining service.

In a variation of this embodiment, the owner of the privileged schema can grant privileges to a second user. In this variation, if the second user is not the owner of the privileged schema, the system checks if the privileged schema owner granted privileges to the second user. If so, the system determines if the second user has privilege for the database operation in question. If the user has privilege to execute the database operation, the database operation is executed. On the other hand, if the privileged schema owner has not granted privileges to the second user, or if the second user does not have privilege to execute the database operation in question, then the database operation is rejected.

In a further variation, the owner of the privileged schema can grant privileges to the second user. However, these privileges do not enable the updating or deleting of data within the privileged schema.

In a further variation, the privileged schema owner can add or remove the privileged schema status.

In a variation of this embodiment, the schema objects can include tables, views, triggers, stored procedure, synonyms, database links, constraints, and any other schema object known to those skilled in the art.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device that can store code and/or data for use by a computer system. This includes magnetic and optical storage devices such as disk drives, magnetic tape, CDs (compact discs) and DVDs (digital versatile discs or digital video-discs), etc.

Overview

The present invention provides a method to facilitate privileged schema in a database. In one embodiment of the present invention, the method facilitates a privileged object store in a database.

In one embodiment of the present invention, upon installing a database, an administrator is given the option to select whether to install the database with the privileged schema functionality enabled or not enabled. This allows an organization to block the use of privileged schema for various reasons, including if the use of privileged schema violates the organization's policies.

If the privileged schema feature is enabled, a user can choose to create a schema object and can then apply a command to enable privileged schema protection. This allows a schema owner to control who has access to the schema.

Furthermore, a schema owner has the ability to grant privilege to access the schema to a second user. When a database receives a database operation against a privileged schema, the database checks whether the user is the schema owner, or has been granted permission to perform the database operation by the schema owner.

One embodiment of the present invention provides an increased level of security over previous related art because super-users and administrators can not override the passwords of the schema owner. This is accomplished by authenticating users through third-party services.

Computing Environment

Figure 1:
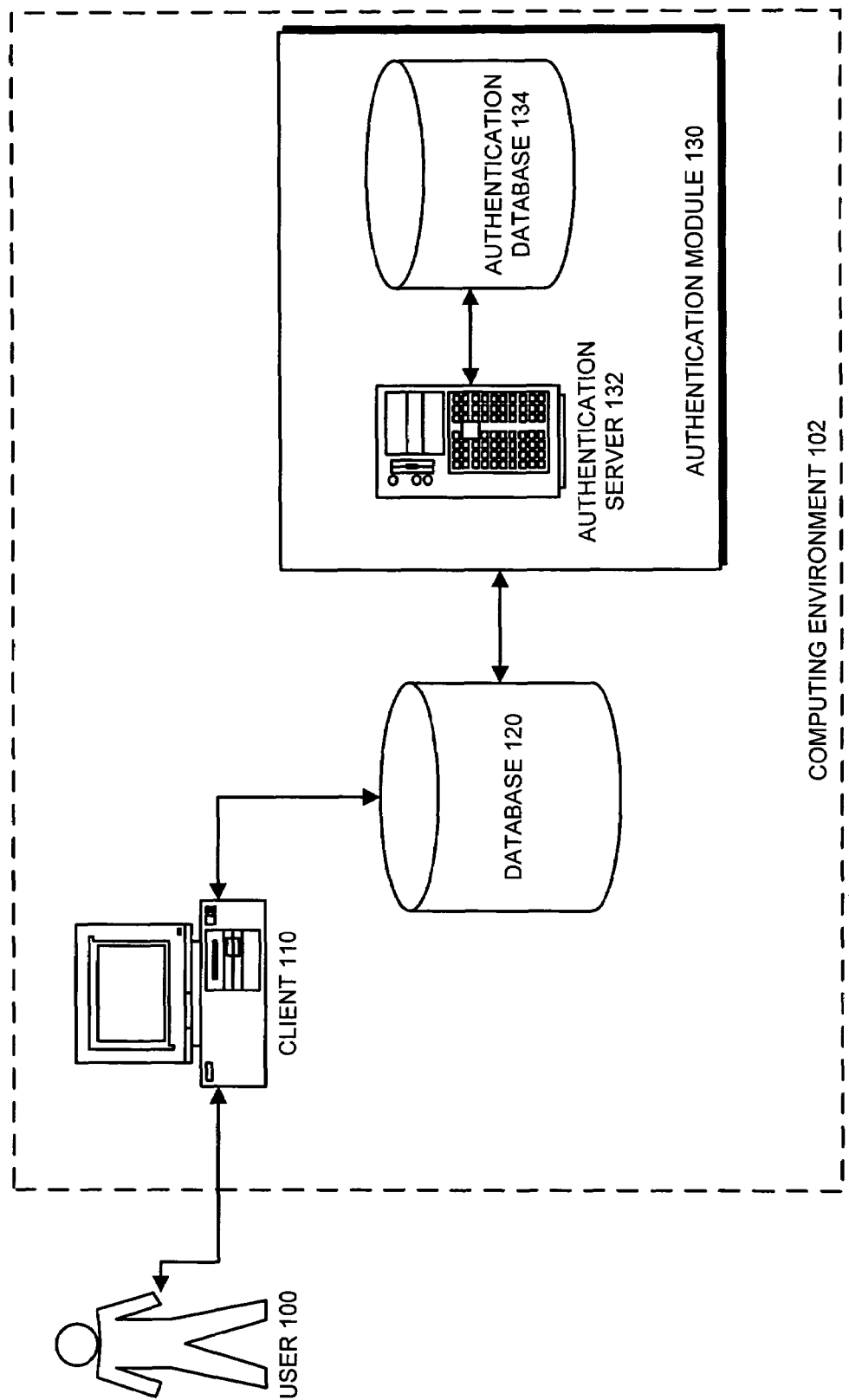
FIG. 1 illustrates a computing environment in accordance with an embodiment of the present invention.

FIG. 1 illustrates a computing environment 102 in accordance with an embodiment of the present invention. Computer environment 102 can generally include any type of computer system, including, but not limited to, a computer system based on a microprocessor, a mainframe computer, a digital signal processor, a portable computing device, a personal organizer, a device controller, and a computational engine within an appliance. Computing environment 102 includes client 110, database 120, and authentication module 130. Client 110 can generally include any node on a network including computational capability and including a mechanism for communicating across the network. Database 120 can include any type of system for storing data in non-volatile storage. This includes, but is not limited to, systems based upon magnetic, optical, and magneto-optical storage devices, as well as storage devices based on flash memory and/or battery-backed up memory.

Authentication module 130 can include any type of module that performs authorization, or authentication of a user or transaction. Note that authentication module 130 may or may not be contained within the primary database system. Authentication module 130 includes authentication server 132, and authentication database 134. Server 132 can generally include any computational node including a mechanism for servicing requests from a client for computational and/or data storage resources.

During operation, client 110 sends a database operation request from user 100 to database 120. Upon receipt of the database operation request, database 120 sends an authentication request to authentication module 130. If user 100 is verified as the privileged schema owner, the database operation is executed.

In one embodiment of the present invention, user 100 does not have to be the owner of the privileged schema. Instead, user 100 can be granted privilege, from the privileged schema's owner, to execute the database operation.

Database Schema

Figure 2A:
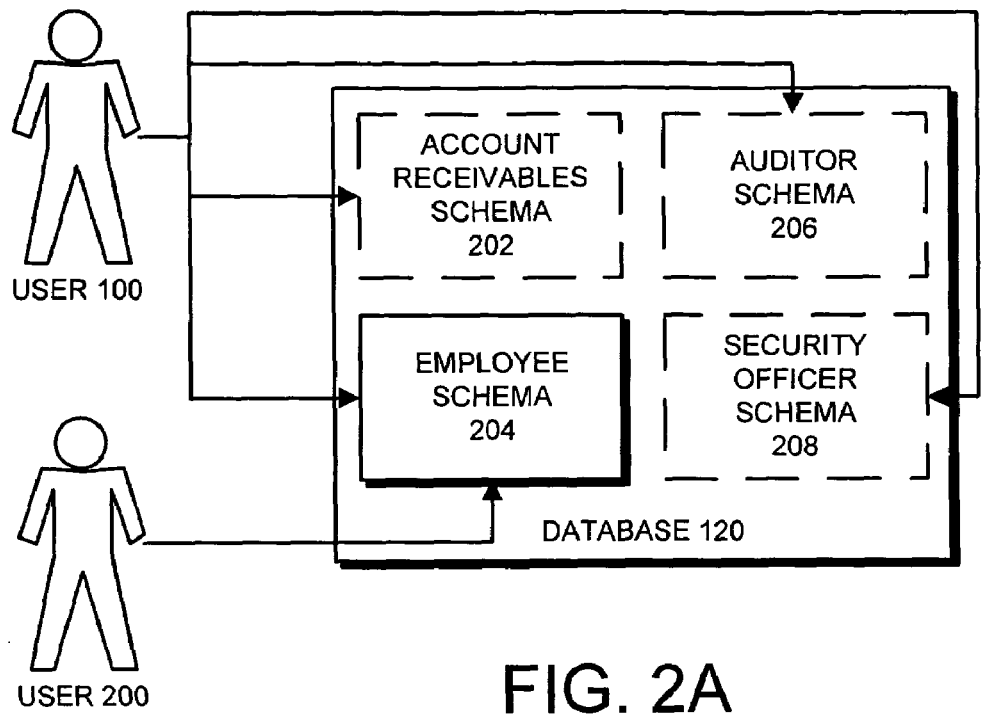
FIG. 2A illustrates users with access to database schema in accordance with an embodiment of the present invention.

FIG. 2A illustrates users 100 and 200 who can access a number of database schema in accordance with an embodiment of the present invention. In FIG. 2A, database 120 contains four schemas, 202, 204, 206, and 208, which are privileged schemas. A schema can be defined as a collection of database objects and database operations. In this example, user 100 is a high-level executive who is the owner of schema 202, schema 206, and schema 208. User 100 may or may not be the owner of schema 204. However, user 100 has permission to access schema 204.

In the example in FIG. 2A, user 200 is the database administrator. Therefore, user 200 has access to employee schema 204 for the purpose of adding and removing users. However, user 200 does not have access to privileged schemas 202, 206, and 208. Furthermore, despite being the database administrator, user 200 cannot obtain access to user 100's privileged schemas because authentication occurs through a third party service which user 200 does not have control over.

Figure 2B:
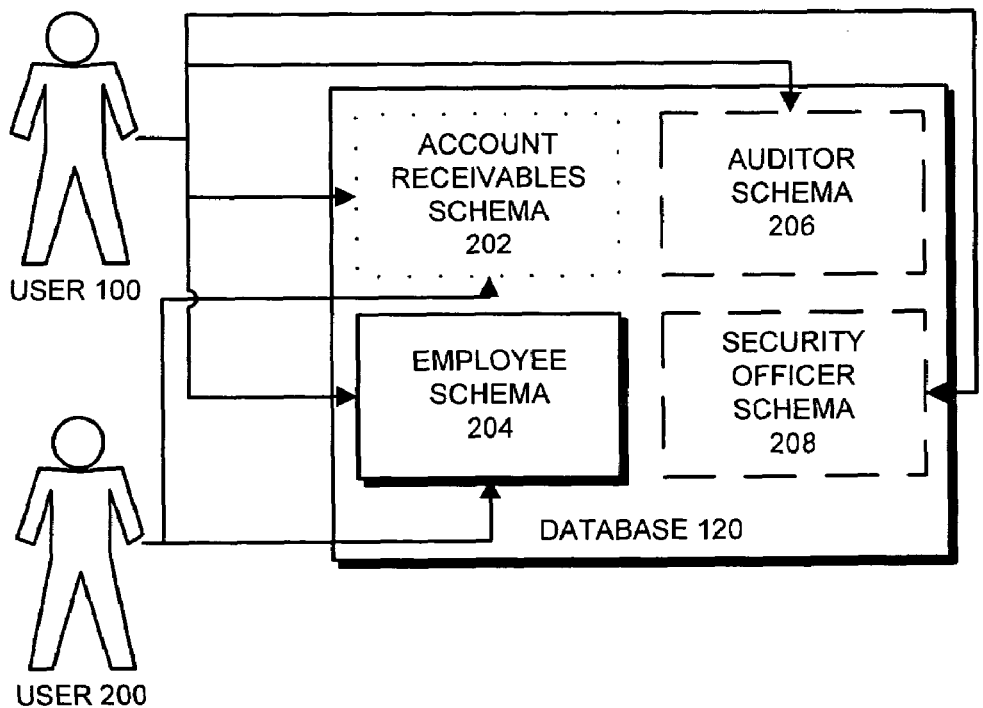
FIG. 2B illustrates users with modified access to database schema in accordance with an embodiment of the present invention.

FIG. 2B illustrates users 100 and 200 who can access a number of database schema in accordance with an embodiment of the present invention. In this example, user 100 decides that user 200 should help with the account receivables schema 202. To facilitate this, user 100 grants privilege to user 200 to access account receivables schema 202.

FIG. 2A illustrates two different privileged schema sets; the privileged schema marked with a solid line indicate privileged schema that only user 100 can access, and the privileged schema marked with a dashed line indicate privileged schema that both user 100 and user 200 can access. FIG. 2B illustrates the granting of privilege by the creation of a new privileged schema set as indicated by the conversion of schema 202 from dashed line to dotted line.

Activation of the Privileged Schema Option

Figure 3A:
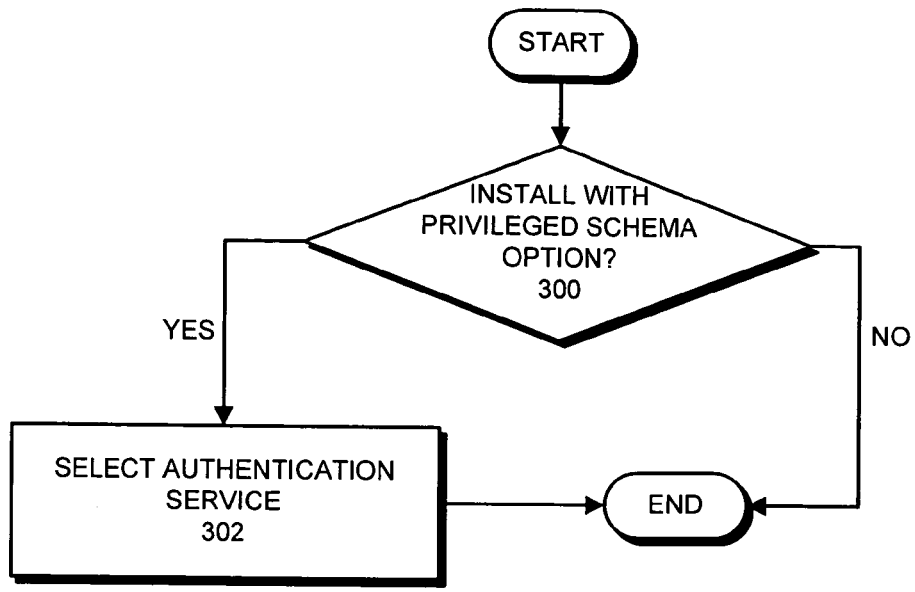
FIG. 3A presents a flowchart illustrating the process of activating the privileged schema option in accordance with an embodiment of the present invention.

FIG. 3A presents a flowchart illustrating the activation of the privileged schema option in accordance with an embodiment of the present invention. In order for the privileged schema feature to be available, it has to be selected at installation time. At installation time, the database presents the user with the choice of installing with or without the privileged schema feature (step 300). If the privileged schema option is chosen, the user selects what third-party authentication service to use (step 302).

Assignment of Privilege to a Schema

Figure 3B:
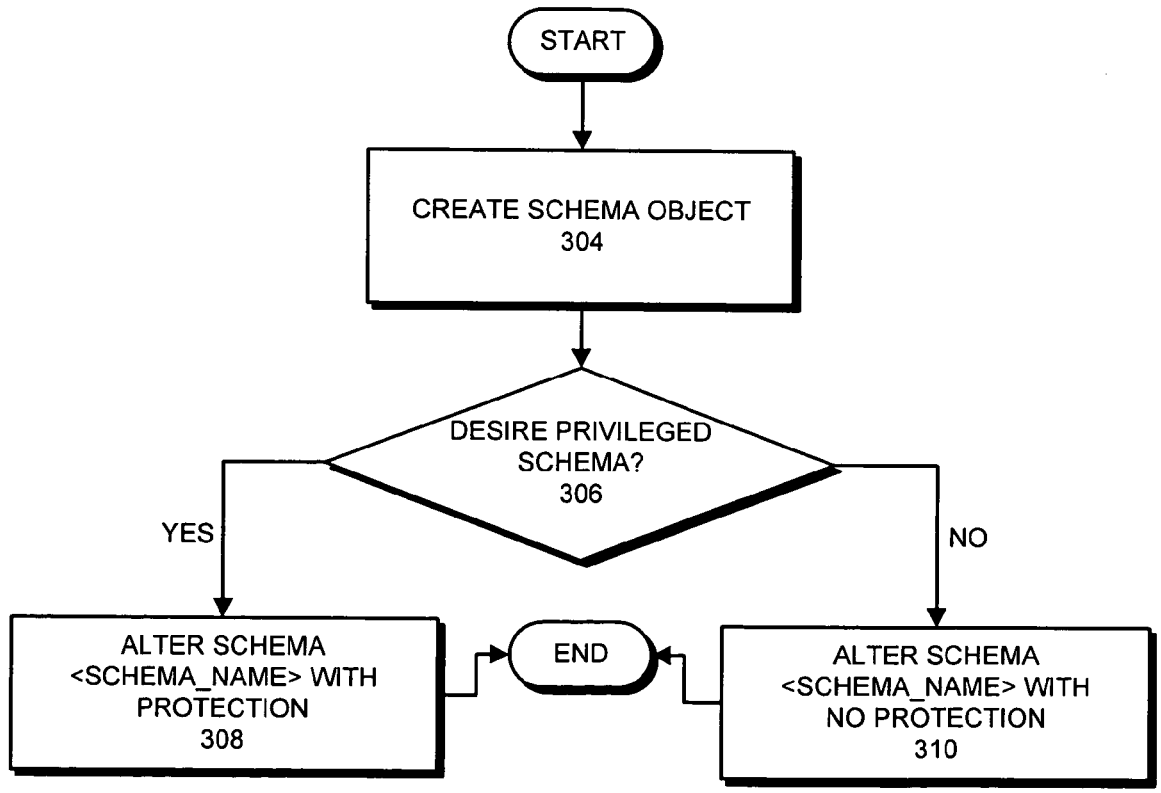
FIG. 3B presents a flowchart illustrating the process of assigning privilege to a schema in accordance with an embodiment of the present invention.

FIG. 3B presents a flowchart illustrating the assignment of privilege to a schema in accordance with an embodiment of the present invention. The system starts when a schema object is created (step 304). Next, the user decides whether to make the schema a privileged schema (step 306). If so, the user indicates the schema should be privileged with a database command. For example, the database command might be a SQL, structured query language, statement such as ALTER SCHEMA <schema_name> WITH PROTECTION (step 308). If not, the user can use a similar database command to ensure that the schema is not privileged, such as ALTER SCHEMA <schema_name> WITH NO PROTECTION (step 310). Note that this database command can also be used to remove the privileged schema designation from a schema that the user had originally indicated should be privileged.

Executing a Database Operation

Figure 4:
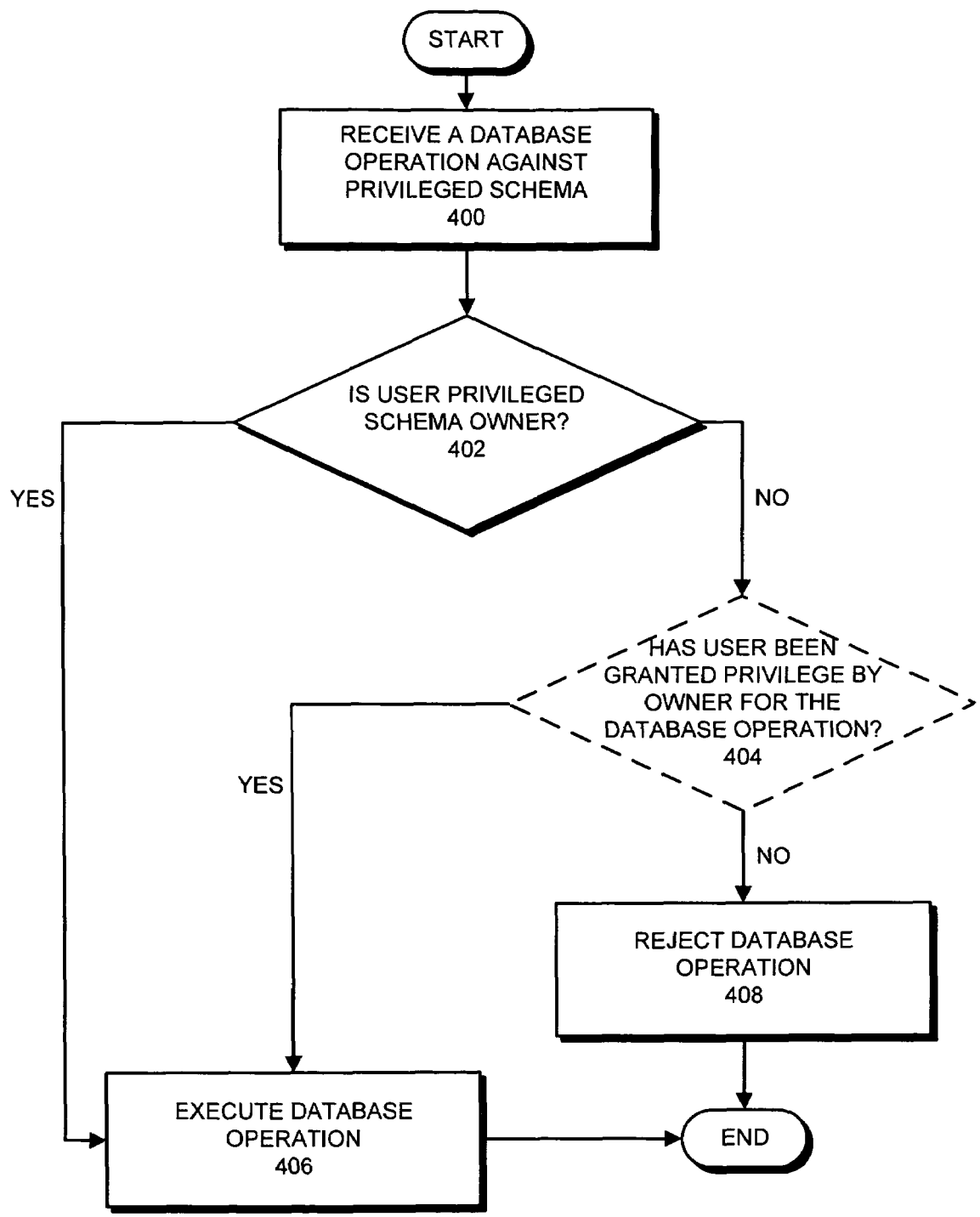
FIG. 4 presents a flowchart illustrating the process of executing a database operation against a privileged schema in accordance with an embodiment of the present invention.

FIG. 4 presents a flowchart illustrating the process of executing a database operation against a privileged schema in accordance with an embodiment of the present invention. The process begins with the database receiving a database operation request against a privileged schema (step 400). The database then authenticates the user by sending an authentication request to the authentication module. The authentication module determines if the user is the owner of the privileged schema (step 402). If the user is the owner, the database operation is executed. If the user is not the owner, then the database operation is rejected (step 408).

In one embodiment of the present invention, if the user is not the database owner, the authentication module determines if the user was granted privilege by the privileged schema owner to execute the database operation (step 404). If so, the database operation is executed (step 406). If not, the database operation is rejected (step 408).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for implementing a privileged schema in a database, wherein the privileged schema comprises a set of database objects and wherein the computer includes a processor, the method comprising:
   receiving at the computer the privileged schema which is created by an owner,
      wherein the owner of the privileged schema controls who has access to the privileged schema, and a system administrator is not the owner of the privileged schema;
      wherein the system administrator is granted access to the privileged schema only with permission by the owner of the privileged schema and is otherwise denied access to the privileged schema; and
      wherein the system administrator is precluded from overriding the owner's control of who has access to the privileged schema;
   receiving a database operation to modify one or more objects associated with the privileged schema from a user at the database;
   authenticating the user through an authentication service not controlled by the system administrator to determine if the user is the owner of the privileged schema;
   executing the database operation when the user is the owner of the privileged schema; and
   otherwise, rejecting the database operation.

2. The method of claim 1, wherein prior to creating the privileged schema, the method further comprises:
   receiving a selection from the user indicating whether or not to enable the privileged schema feature; and
   receiving a selection from the user identifying the authentication service for the privileged schema.

3. The method of claim 2, wherein the authentication service is a third party service which includes one of:
   Kerberos;
   RADIUS; or
   any other authentication-determining service.

4. The method of claim 1, wherein the owner of the privileged schema can grant privileges to a second user.

5. The method of claim 4, wherein if the second user is not the owner of the privileged schema, the method further comprises:
   checking if the privileged schema owner granted privileges to the second user;
   determining if the second user has privilege for the database operation when the privileged schema owner granted privileges to the second user;
   executing the database operation when the second user has privilege for the database operation;
   otherwise, rejecting the database operation; and
   rejecting the database operation when the privileged schema owner did not grant privileges to the second user.

6. The method of claim 4,
   wherein the owner of the privileged schema grants privileges to the second user; and
   wherein the privileges do not enable updating or deleting of data within the privileged schema.

7. The method of claim 2, wherein the privileged schema owner adds or removes the privileged schema status.

8. The method of claim 1, wherein schema objects comprise:
   tables;
   views;
   triggers;
   stored procedures;
   synonyms;
   database links; and
   constraints.

9. A computer-readable storage device storing instructions that when executed by a computer cause the computer to perform a method for implementing a privileged schema in a database, wherein the privileged schema comprises a set of database objects and wherein the computer includes a processor, the method comprising:
   receiving at the computer the privileged schema which is created by an owner,
      wherein the owner of the privileged schema controls who has access to the privileged schema, and a system administrator is not the owner of the privileged schema;
      wherein the system administrator is granted access to the privileged schema only with permission by the owner of the privileged schema and is otherwise denied access to the privileged schema; and
      wherein the system administrator is precluded from overriding the owner's control of who has access to the privileged schema;
   receiving a database operation to modify one or more objects associated with the privileged shcema from a user at the database;
   authenticating the user through an authentication service not controlled by the system administrator to determine if the user is the owner of the privileged schema;
   executing the database operation when the user is the owner of the privileged schema; and
   otherwise, rejecting the database operation.

10. The computer-readable storage device of claim 9, wherein prior to creating the privileged schema, the method further comprises:
   receiving a selection from the user indicating whether or not to enable the privileged schema feature; and
   receiving a selection from the user identifying the authentication service for the privileged schema.

11. The computer-readable storage device of claim 10, wherein the authentication service is a third party service, which includes one of:
   Kerberos;
   RADIUS; or
   any other authentication-determining service.

12. The computer-readable storage device of claim 9, wherein the owner of the privileged schema can grant privileges to a second user.

13. The computer-readable storage device of claim 12, wherein if the second user is not the owner of the privileged schema, the method further comprises:
   checking if the privileged schema owner granted privileges to the second user;
   determining if the second user has privilege for the database operation when the privileged schema owner granted privileges to the second user;
      executing the database operation when the second user has privilege for the database operation;
      otherwise, rejecting the database operation; and
   rejecting the database operation when the privileged schema owner did not grant privileges to the second user.

14. The computer-readable storage device of claim 12,
   wherein the owner of the privileged schema grants privileges to the second user; and
   wherein the privileges do not enable updating or deleting of data within the privileged schema.

15. The computer-readable storage device of claim 10, wherein the privileged schema owner adds or removes the privileged schema status.

16. The computer-readable storage device of claim 9, wherein schema objects comprises:
   tables;
   views;
   triggers;
   stored procedures;
   synonyms;
   database links; and
   constraints.

17. An apparatus for implementing a privileged schema in a database, wherein the privileged schema comprises a set of database objects, the apparatus comprising:
   a processor;
   a memory;
   a database;
   a schema-receiving mechanism within the database configured to receive the privileged schema which is created by an owner;
   wherein the owner of the privileged schema controls who has access to the privileged schema, and a system administrator is not the owner of the privileged schema;
   wherein the system administrator is granted access to the privileged schema only with permission by the owner of the privileged schema and is otherwise denied access to the privileged schema; and
   wherein the system administrator is precluded from overriding the owner's control of who has access to the privileged schema;
   an operation-receiving mechanism within the database configured to receive a database operation to modify one or more objects associated with the privileged schema from a user at the database;
   an authentication mechanism within the database configured to authenticate the user through an authentication service not controlled by the system adminstrator to determine when the user is the owner of the privileged schema; and
   an execution mechanism within the database configured to execute the database operation if the user is the owner of the privileged schema.

18. The apparatus of claim 17, wherein the operation-receiving mechanism is further configured to:
   receive a selection from the user indicating whether or not to enable the privileged schema feature; and to
   receive a selection from the user identifying the authentication service for the privileged schema.

19. The apparatus of claim 18, wherein authentication mechanism is further configured to use:
   Kerberos;
   RADIUS; and
   any other authentication-determining service.

20. The apparatus of claim 17, further comprising a privilege granting mechanism configured to grant privileges from the owner to a second user.

* * * * *

UNITED STATES PATENT AND TRADEMARK OFFICE
CERTIFICATE OF CORRECTION

| | | |
|---|---|---|
| PATENT NO. | : 7,653,630 B2 | Page 1 of 1 |
| APPLICATION NO. | : 11/210326 | |
| DATED | : January 26, 2010 | |
| INVENTOR(S) | : Daniel ManHung Wong | |

It is certified that error appears in the above-identified patent and that said Letters Patent is hereby corrected as shown below:

In column 6, line 46, in claim 9, delete "shcema" and insert -- schema --, therefor.

In column 8, line 20, in claim 17, delete "adminstrator" and insert -- administrator --, therefor.

Signed and Sealed this

Fourteenth Day of September, 2010

David J. Kappos
*Director of the United States Patent and Trademark Office*